United States Patent
Rane et al.

(10) Patent No.: US 10,038,577 B2
(45) Date of Patent: Jul. 31, 2018

(54) EQUALIZER BOOST SETTING

(71) Applicant: TEXAS INSTRUMENTS INCORPORATED, Dallas, TX (US)

(72) Inventors: Amit Rane, Santa Clara, CA (US); Roland Ribeiro, Santa Clara, CA (US); Leung Kin Chiu, Palo Alto, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/394,292

(22) Filed: Dec. 29, 2016

(65) Prior Publication Data

US 2018/0191534 A1    Jul. 5, 2018

(51) Int. Cl.
*H03H 7/40* (2006.01)
*H04L 25/03* (2006.01)

(52) U.S. Cl.
CPC .............. *H04L 25/03949* (2013.01)

(58) Field of Classification Search
CPC ........ H04L 25/03038; H04L 25/03057; H03H 21/0012; H03H 21/0043; H04B 25/03038
USPC .................. 375/232, 229, 233; 708/322, 323
See application file for complete search history.

(56) References Cited

U.S. PATENT DOCUMENTS

| | | | |
|---|---|---|---|
| 2015/0349989 A1* | 12/2015 | Farjad-Rad | H04L 25/03019 375/232 |
| 2017/0054575 A1* | 2/2017 | Sakai | H04L 25/03057 |
| 2017/0171002 A1* | 6/2017 | Palmer | H04L 27/01 |

* cited by examiner

*Primary Examiner* — Khai Tran
(74) *Attorney, Agent, or Firm* — John R. Pessetto; Charles A. Brill; Frank D. Cimino (57) ABSTRACT

One example includes a system that is comprised of an equalizer, a counter, and a controller. The equalizer equalizes an incoming signal and provide an equalized output signal over a plurality of time intervals according to a given equalizer setting thereof. The counter provides a count value to represent to a number of times that the equalized output signal crosses each of a plurality of thresholds over the plurality of time intervals. The controller evaluates the count value for each of the plurality of thresholds at each of a plurality of equalizer settings and configures the equalizer setting based on the evaluation of the count values for each of the equalizer settings.

16 Claims, 6 Drawing Sheets

EQUALIZER BOOST SETTING

TECHNICAL FIELD

This disclosure relates generally to an equalizer and, more particularly to setting a boost of an equalizer.

BACKGROUND

Equalizers are used in applications to extend reach and improve robustness of high-speed serial links for multiple rates and multiple protocols. Such high-speed serial links can include, for example, front-port, backplane, and chip-to-chip applications. The equalizer can be linear and preserve transmit signal characteristics. Each channel may operate independently, which allows the equalizer to support individual lane Forward Error Correction (FEC) pass-through. Many equalizers have manual boost settings that requires time and manual configuration. In other examples, such as adaptive equalizers, equalizer may be adapted during a training mode using a least mean squares approach; however, this relies on the presence of a recovered clock.

SUMMARY

One example includes a system that is comprised of an equalizer, a counter, and a controller. The equalizer equalizes an incoming signal and provide an equalized output signal over a plurality of time intervals according to a given equalizer setting thereof. The counter provides a count value to represent to a number of times that the equalized output signal crosses each of a plurality of thresholds over the plurality of time intervals. The controller evaluates the count value for each of the plurality of thresholds at each of a plurality of equalizer settings and configures the equalizer setting based on the evaluation of the count values for each of the equalizer settings.

Another example includes a method comprising equalizing an input test signal to provide an equalized output signal; comparing the equalized output signal to a given threshold of a plurality of thresholds; counting a number of times that the equalized output signal crosses the given threshold during a plurality of time intervals at a given equalizer setting; storing a count value for each of the plurality of thresholds at the given equalizer setting based on the counting; repeating the counting and the storing for each other thresholds at each of a plurality of other equalizer settings; evaluating the count values stored for each of the plurality of equalizer settings to identify which of the plurality of equalizer settings resulted in a constant count value over the largest number of consecutive thresholds; and configuring the equalizer with the identified equalizer setting based on the evaluation.

Another example includes another system comprising an equalizer, a comparator, a counter, a controller, and a digital-to-analog controller. The equalizer equalizes an input signal and provides an equalized output signal over a plurality of time intervals. The comparator compares the equalized output signal to a given threshold to detect each occurrence that the output signal crosses the threshold. The counter counts a number of times that the equalized output signal crosses each of the plurality of thresholds for the given equalizer setting. The controller evaluates the number of times that the equalized output signal crosses each of the plurality of thresholds for each of a plurality of equalizer settings and configures the equalizer setting based on the number of times that the equalized output signal crosses the plurality of thresholds for each of the equalizer settings. The digital-to-analog converter sets the threshold to one of the plurality of thresholds based on a threshold setting signal provided by the controller.

DETAILED DESCRIPTION

This disclosure relates generally to an equalizer and to systems and methods of configuring a boost setting of an equalizer. For example, a system is disclosed to count a number of times that output voltages of the equalizer cross a series of threshold voltages. An evaluation of the count values across an input test waveform are employed to configure a boost setting of the equalizer.

As an example, a system to determine an optimal equalizer setting includes an equalizer, a counter and a controller. The equalizer equalizes an incoming signal (e.g., a test pattern) and provides an equalized output signal over a plurality of time intervals. The counter counts a number of times that the equalized output signal crosses each of a plurality of thresholds for a given equalizer setting. This may be repeated for the same test pattern over of a plurality of different equalizer settings to provide a respective set of count values based on the number threshold crossings for each setting (e.g., estimating a cumulative distribution function (CDF) of an eye diagram for each equalizer setting). The controller evaluates the number of times that the equalized output signal crosses each of the plurality of thresholds for each of the plurality of different equalizer settings (e.g., corresponding evaluating the CDFs for each equalizer setting). For example, the controller determines which boost setting achieves a constant count value over the largest number of consecutive threshold levels. The controller then configures the equalizer boost setting based on such evaluation. Such approach allows an optimal equalizer setting to be determined automatically by the controller and without the presence of a recovered clock, which simplifies the determination of the optimal equalizer setting. Moreover, analog and digital circuitry can be fabricated on one or more integrated circuit chips on a small area and use minimal power within the system, and allow determination of the optimal boost setting irrespective of the data rate of the incoming signal to the equalizer.

Figure 1:
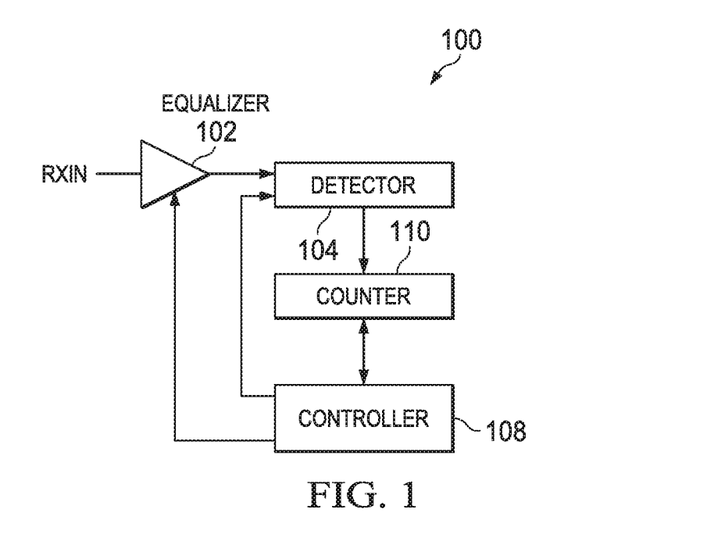
FIG. 1 illustrates an example of a system to determine equalizer setting of an equalizer.

FIG. 1 illustrates an example of a system 100 to determine equalizer setting of an equalizer 102. The system 200 includes a digital portion and an analog potion, the digital portion including a controller 108 and the counter 110 and the analog portion including the equalizer 102 and a detector 104.

In an example, the equalizer 102 is one of a continuous time linear equalizer (CTLE), a decision feedback equalizer (DFE), and a feed-forward equalizer (FFE). Unlike some existing approaches, the system 100 does not rely on a recovered clock. The system 100 may include the equalizer 102 coupled to the detector 104. The equalizer 102 accepts a digital input signal, RXIN, and produces an equalized output signal. The equalized output signal is applied to the detector 104. As a further example, the equalizer may be implemented as an adaptive equalizer having a plurality of configurations that control the equalization function, which may be programmed by setting corresponding operating parameters. As disclosed herein, the operating parameters thus may be tuned automatically during a calibration with a test pattern.

The detector 104 receives the equalized output signal from the equalizer 102. The detector 104 detects when the equalized output signal crosses each of a plurality of threshold voltage levels (e.g., a range of discrete voltage levels distributed evenly between expected minimum and maximum equalized output signals). In some examples, the different thresholds are evaluated with respect to different portions of the equalized output signal. In an example, the number of threshold levels is programmable. The controller 108 changes the threshold voltage that is detected by the detector 104 during a given test interval. The detector 104 is further coupled to the counter 110. In an example, the counter 110 may be an asynchronous counter. Each time the equalized output signal crosses the threshold voltage, the detector 104 produces an output signal that is applied to the counter 110. The counter 100 counts the number of times that it receives such a signal from the detector 104, thereby counting the number of times that the equalized output signal crosses the threshold voltage. A corresponding count value thus may be obtained for each of the thresholds at the same given equalizer configuration (e.g., equalizer operating parameters). Similar sets of count values for each of the thresholds can be obtained at different equalizer settings.

The controller 108 is coupled to the detector 104. The controller 108 sets the threshold voltage that is detected by the detector 104. The controller 108 sets the detector 104 to a plurality of different thresholds over a plurality of time periods, respectively. The controller 108 outputs, to the detector 104, threshold setting signals according to the various increments determined by the controller 108. Once all of the threshold increments are evaluated by the controller 108, a next equalizer setting and its associated thresholds are analyzed by the controller 108.

The controller 108 is further coupled to the counter 110. The controller 108 receives the count value from the counter 110. The controller 108 stores the count value and its associated equalizer setting that produced that count value. The controller 108 maintains a log of the number of times that the threshold voltage is crossed for each of these time periods.

Figure 4:
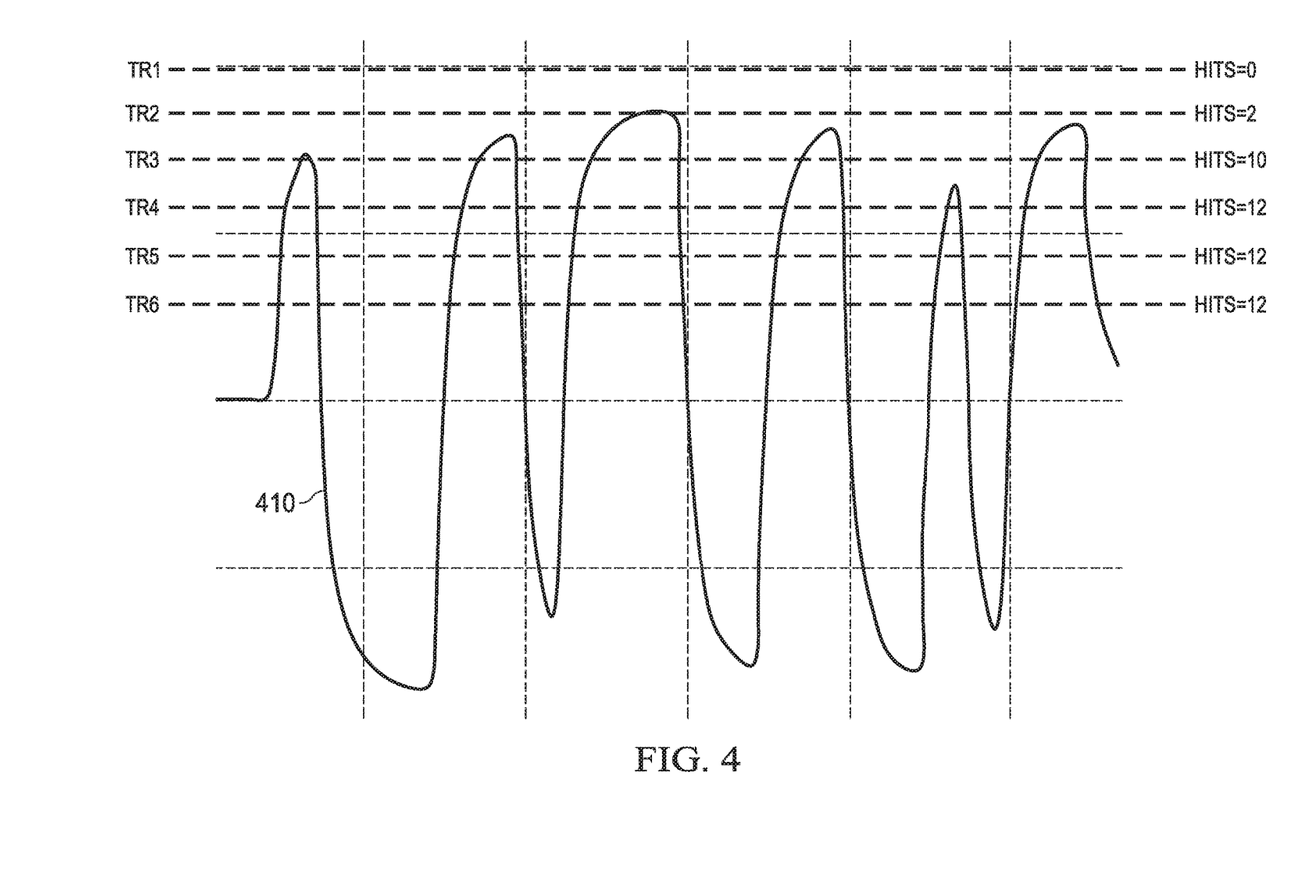
FIG. 4 illustrates an example output signal and a number of hits for various threshold voltages.

The controller 108 evaluates the count values stored for each of the plurality of equalizer settings to identify which of the plurality of equalizer settings resulted in a constant count value over the largest number of consecutive thresholds, with the consecutive thresholds being an unbroken chain of increasing or decreasing thresholds for a particular equalizer setting that have a constant count value, an example of which is shown in FIG. 4. The controller 108 then sets the equalizer setting of the equalizer 102 to the equalizer setting that resulted in the most number of times that the thresholds were crossed. This equalizer setting is the optimal boost equalizer setting for the equalizer 102. In an example, the controller 108 estimates a cumulative distribution function (CDF) for each equalizer setting based on the count value for each of the plurality of threshold levels, each of the estimated CDF's being compared to determine which of the plurality of equalizer settings results in the count value being constant over the largest number of consecutive threshold levels. Count values being constant over the largest number of consecutive threshold levels result in a straight line CDF, with the equalizer setting with the longest straight line correlating to an optimal boost setting for the equalizer 102.

Figure 2:
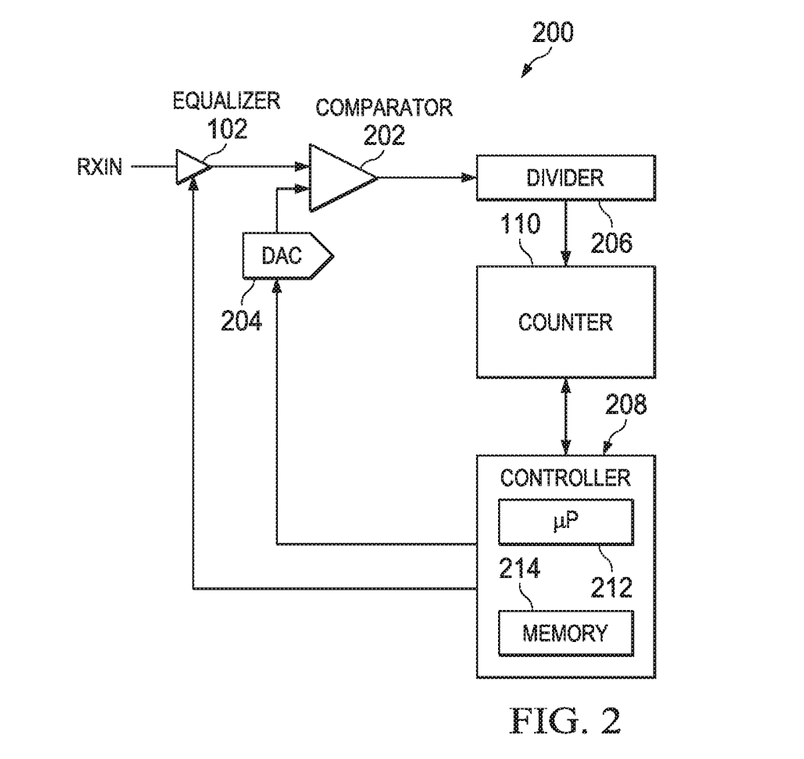
FIG. 2 illustrates another example of a system to determine an equalizer setting of an equalizer.

FIG. 2 illustrates another example of a system 200 to determine an equalizer setting of an equalizer 102. The system 200 includes a digital portion and an analog potion, the digital portion including a controller 208 and the counter 110 and the analog portion including the equalizer 102, a comparator 202, a divider 206, and a digital-to-analog (DAC) controller 204. In this example, the system 200 includes the comparator 202 coupled to the equalizer 102. The comparator 202 is further coupled to the DAC 204. The voltage produced by the equalizer 102 is applied to an input of the comparator 202 and the voltage produced by the DAC 204 is applied to another input of the comparator 202. The voltage produced by the DAC 204 is the threshold voltage. The comparator 202 compares these two voltages and produces a corresponding output signal. In this instance, the comparator 202 compares the instantaneous voltage produced by the equalizer 102 and the voltage produced by the DAC 204 to determine if the instantaneous voltage produced by the equalizer 102 crosses the voltage produced by the DAC 204. If the voltage produced by the equalizer 102 crosses the voltage produced by the DAC 204, the comparator 202 produces an output signal indicating that the threshold has been crossed. This can be implemented for the equalized output signal, whether increasing or decreasing.

In this example, the comparator 202 is further coupled to the divider 206, with the divider 206 being coupled to the counter 110. For example, the comparator 202 produces an output signal at a speed greater than the counter 110 can match. The divider 206 divides the output of the comparator 202 to allow the counter 110 to match a speed of the comparator 202. In an example, the divider 206 divides the output of the comparator 202 by sixteen.

The controller 208 performs the functions described above for the controller 108. Additionally, the controller 208 sends a threshold setting signal to the DAC 204. The DAC 204 sets the threshold voltage of the comparator 202 based on such a threshold setting signal from the controller 208. The controller 208 is also coupled to the equalizer 102. The controller 208 sets the equalizer boost setting of the equalizer 102. The controller 208 is further coupled to the counter 110. The controller 208 sets a length of time that the counter 110 counts, resets the count value counted by the counter 110, and obtains the count value counted by the counter 110.

The controller 208 includes a microprocessor (or state machine) 212 and a memory 214. The microprocessor 212 stores and reads the count values for the thresholds and their associated equalizer setting to/from the memory 214. The microprocessor 212 evaluates the count values stored for each of the plurality of equalizer settings to identify which of the plurality of equalizer settings resulted in a constant count value over the largest number of consecutive thresholds. The microprocessor 212 selects the equalizer setting with a constant count value over the largest number of consecutive thresholds and sets the equalizer 102 with this equalizer setting as the optimum equalizer setting.

Figure 3:
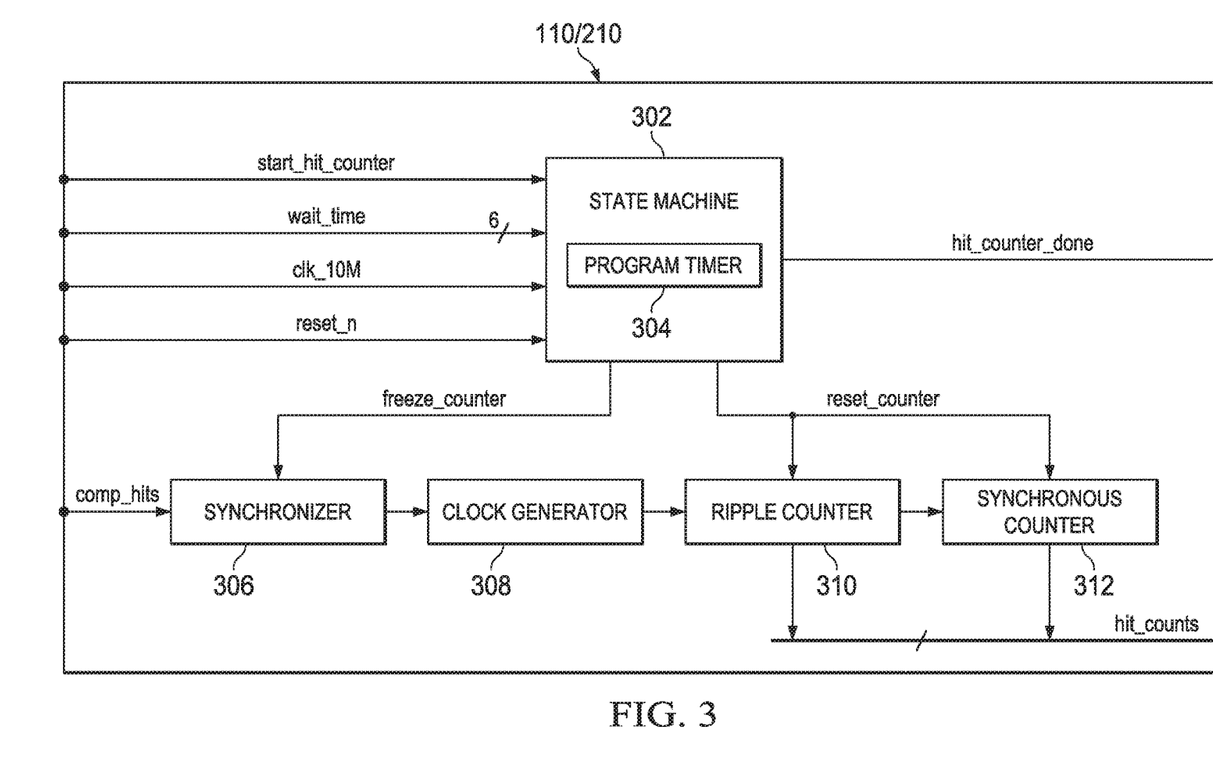
FIG. 3 illustrates an example counter shown in FIGS. 1 and 2.

FIG. 3 illustrates an example counter 110 shown in FIGS. 1 and 2. The counter 110 includes a hit counter state machine 302. The state machine 302 receives signals from the controller 108. The hit counter state machine 302 is coupled to a start_hit_counter signal line to receive a start counting signal from the controller 108 via the start_hit_counter signal line. The state machine 302 is further coupled to a wait_time signal line to receive a signal from the controller 108. The controller 108 instructs the counter 110 to wait an amount of time before beginning counting via a signal on the wait_time signal line. The state machine 302 is further coupled to a clk_10M signal line (10 MHz clock). The state machine 302 is further coupled to a reset_n signal line to receive a signal from the controller 108, the controller 108 instructing the counter 110 to reset the count number stored by the counter 110 via the signal on the reset_n signal line. The state machine 302 is further coupled to hit_count_done signal line. The controller 108 receives an indication from the counter 110 that counting has completed counting via the hit_count_done signal line.

The hit counter state machine 302 includes a programmable timer 304. The controller 108 programs the programmable timer 304 to run for a length of time. This length of time is the amount of time the counter 110 counts the number of times that the output signal from the equalizer 102 crosses a particular threshold, as detected by the detector 104 and comparator 202. The controller 108 programs the programmable timer 304 to run for the length of time that will result in capturing a number of cycles of the output signal from the equalizer 102 that crosses the threshold voltage, the length of time allowing a determine an optimum boost setting for the equalizer 102. Thus, for higher frequency output signals from the equalizer 102, the programmable timer 304 may be programmed to operate for a shorter length of time to capture a same amount of cycles for a lower frequency output signals from the equalizer 102 in a longer period of time. The programmable timer 304 can be set to run for a length of time that avoids pattern dependencies within the digital input signal, RXIN, for setting an optimal boost setting.

The counter 110 further includes a synchronizer 306 coupled to the hit counter state machine 302. The hit counter state machine 302 is further coupled to the synchronizer 306 via the freeze_counter signal line. In an example, the counter 110 operates asynchronously with respect to the rest of the components within the system 100/200. The synchronizer 306 synchronizes the operation of the counter 110 with the rest of the components within the system 100/200. The synchronizer 306 receives a signal from the detector 104, on a comp_hits signal line, indicating when the voltage applied to the detector 104 has crossed a threshold voltage. The synchronizer 306 is further coupled to the freeze_counter signal line. When the programmable timer 304 has expired, the hit counter state machine 302 sends a signal to the synchronizer 306 via the freeze_counter signal line to cease counting and ignore any further signals on the comp_hits signal line.

The counter 110 further includes a clock generator 308 coupled to the synchronizer 306. The clock generator 308 clocks the signal produced by the synchronizer 306. The clock generator 308 is further coupled to a 4-bit ripple counter 310, which is coupled to a 28-bit synchronous counter 312. The 4-bit ripple counter 310 is a high speed counter that is able to keep up with a frequency of the number of times that the detector 104 detects that the threshold voltage has been crossed. The 4-bit ripple counter 310 counts from its reset state of 0000 to its maximum count value of 1111, at which time it sends a signal to the 28-bit synchronous counter to increment its count value by one. The 4-bit ripple counter 310 and the 28-bit synchronous counter 312 are further coupled to the hit counter state machine 302 via a reset_counter signal line. The 4-bit ripple counter 310 and the 28-bit synchronous counter 312 reset their count values according to a signal received on the reset_counter signal line. The 4-bit ripple counter 310 and the 28-bit synchronous counter 312 in aggregate produce a 32 bit count value. This 32 bit count value is output from the 4-bit ripple counter 310 and the 28-bit synchronous counter 312 via the hit_counts signal line to the controller 108.

FIG. 4 illustrates an example output signal 410 and a number of hits for various threshold voltages. The output signal 410 of the equalizer 102 may have the waveform shown, representing logic symbols within the waveform. In some examples, the output signal 410 represents different portions of the equalized signal produced by the equalizer 102, with different thresholds being evaluated with respect to the different portions of the equalized signal. The output signal 410 represents an output of the equalizer 102 for a particular equalizer setting and a particular input signal. Thus, the output signal 410 will vary depending upon the particular equalizer setting and the particular input signal. A number of threshold voltages can be established as a basis to analyze the equalized signal produced by the equalizer 102. In the example shown, six thresholds TR1-TR6 are used to analyze the output signal 410. In other examples, there can be a different number of threshold levels (e.g., typically more). For example, sixty four thresholds are applied to the output signal 410 independently over a time period. In another example, one hundred twenty eight thresholds are applied to the output signal 410 independently over a time period. When the output signal 410 of the equalizer 102 crosses a particular threshold voltage as determined by the detector 104, a "hit" is recorded by the counter 110. Six thresholds are shown as being applied to the output signal 410 for simplicity of explanation. As discussed above, the system 100/200 applies thresholds individually over time as a basis for optimizing the equalizer setting of the equalizer 102.

Figure 5A:
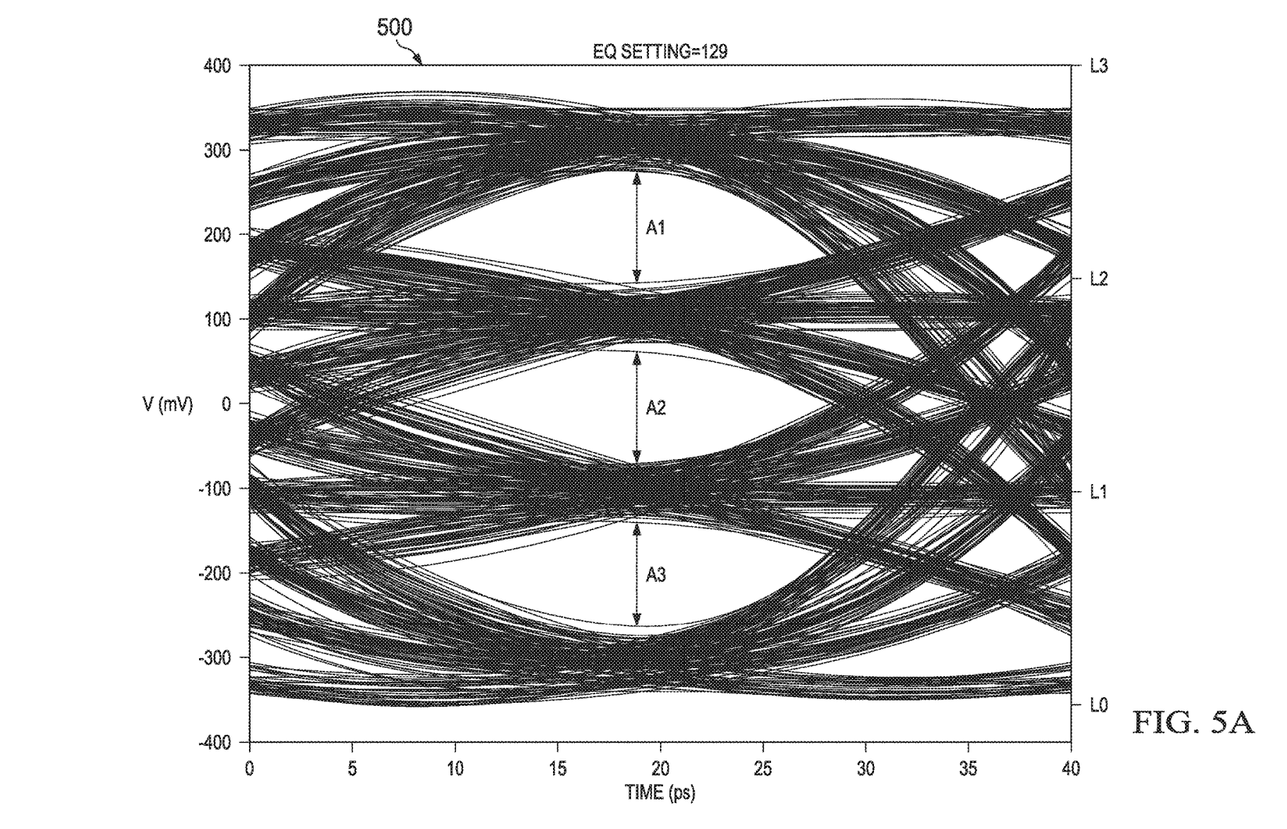
FIGS. 5A and 5B illustrate an example eye diagram for a pulse amplitude modulated signal for different equalizer settings.
Figure 5B:
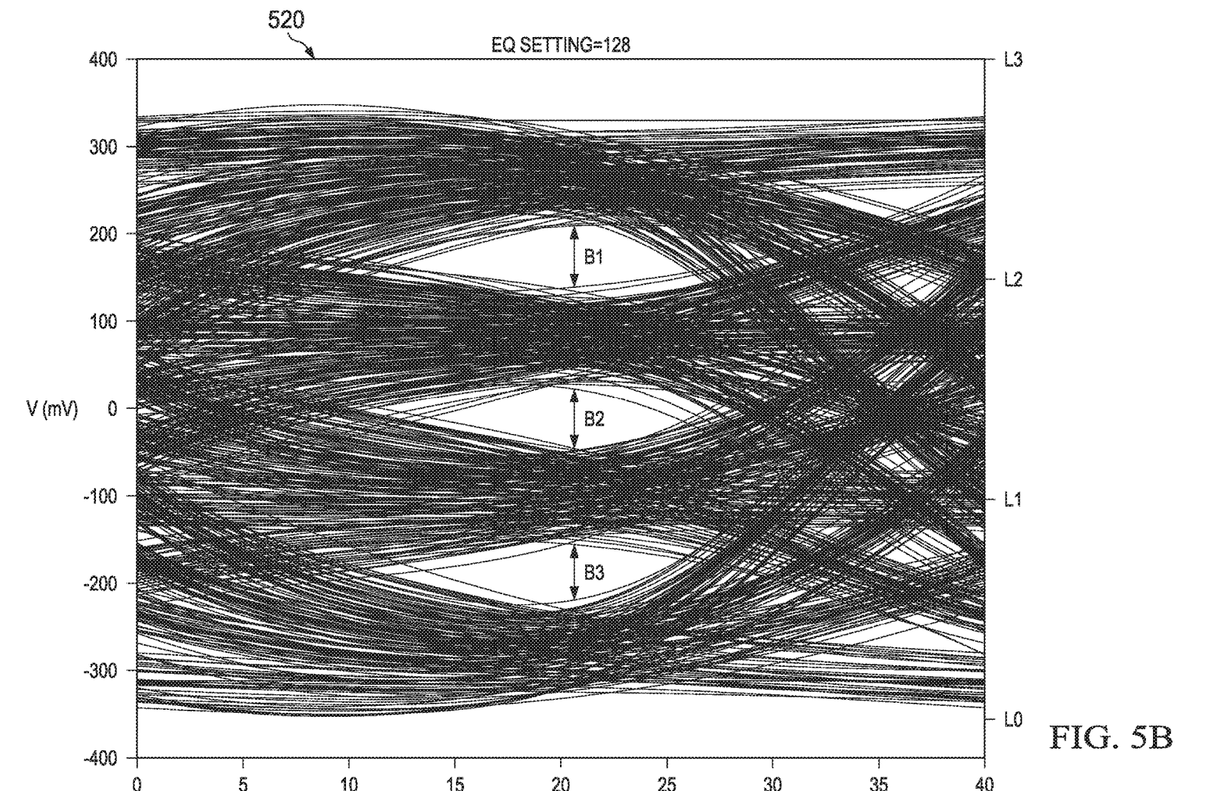

The output signal 410 is illustrated as never crossing the first threshold voltage TR1. Thus, zero hits are recorded by the counter 110 for the first threshold voltage TR1. For the second threshold voltage TR2, the output signal 410 is illustrated as crossing threshold voltage TR2 twice, once during an increasing voltage of the output signal 410 and a second time during a decreasing voltage of the output signal 410. Thus, two hits are recorded by the counter 110 for the second threshold voltage TR2. For the third threshold voltage TR3, the output signal 410 is illustrated as crossing threshold voltage TR3 ten times, five times during an increasing voltage of the output signal 410 and fives times during a decreasing voltage of the output signal 410. Thus, ten hits are recorded by the counter 110 for the third threshold voltage TR2 Likewise, for the fourth, fifth, and sixth threshold voltages TR4, TR5, and TR6 the output signal 410 crosses consecutive thresholds TR4, TR5, and TR6 twelve times each. Thus, twelve hits are recorded by the counter 110 for each of the consecutive fourth, fifth, and sixth threshold voltages TR4, TR5, and TR6. The number of hits will remain constant within a vertical eye opening, as shown in FIGS. 5A and 5B. In the example output signal 410, the hit counts produced by the consecutive fourth, fifth, and sixth threshold voltages TR4, TR5, and TR6 may be used to determine a height of eyes within eye diagrams for the output signal of the equalizer 102, as shown in FIGS. 5A and 5B. The equalizer setting that results in the greatest number of a consecutive same hit count is selected by the controller 108/208 as a basis for setting the equalizer 102 to an optimum setting. In this example, should the particular equalizer setting that produces three thresholds having twelve hits each be a larger number than other equalizer settings, the controller 108/208 will set the equalizer 102 to this equalizer setting. A width of the flat portion of the estimated CDF's produced by the controller 108 gives an estimate of the eye height.

The controller 108 may perform an initial analysis of the output signal 410 as a basis of establishing the range within the output signal to set the thresholds. The controller 108 records the maximum positive voltage produced by the output signal 410 and the maximum negative voltage produced by the output signal 410. This range can be divided by the controller 108 into a number of thresholds, for example, sixty-four thresholds, one hundred twenty eight thresholds, or any number of thresholds that allows a proper analysis of the output signal 410 to determine an optimal boost setting for the equalizer 102. In an example, the controller 108 can be pre-programmed to utilize a set number of thresholds when analyzing the output signal 410. In an example, the number of thresholds may be based on the voltage range of input signal RXIN, with a greater range resulting in a greater number of thresholds being analyzed.

FIGS. 5A and 5B illustrate example eye diagrams 500 and 520 for a four level pulse amplitude modulated (PAM4) signal that are a result of different boost settings. Other levels of PAM could be used in other examples, such as greater or fewer levels. PAM4 cuts the bandwidth for a given data rate in half by transmitting two bits in each symbol. PAM4 signals do not return-to-zero after each symbol. PAM4 is more sensitive to amplitude noise than PAM2-non-return zero (NRZ). PAM4 provides greater resilience to inter-symbol interference (ISI) at a given baud rate on lossy electrical channels, like backplanes, is the primary reason for utilizing PAM4 over other modulation schemes. The eye diagrams 500 and 520, shown in FIGS. 5A and 5B provide a visual representation that enables a user (e.g., a technician) to view the results of setting a boost value for the equalizer 102 and to visually verify the results of determining an optimal boost value with the system 100 and/or 200.

FIG. 5A illustrate an example eye diagram 500 for a PAM4 signal for an equalizer setting of 129. The eye diagram 500 for the PAM4 signal spans a voltage range from approximately 350 mV to −350 mV and, as an example, includes four levels L0-L3 that correspond to the symbols embedded within the PAM4 signal. The eye diagram 500 includes three distinct eyes, eye A1, A2, and A3 for the four levels L0-L3. Eye A2 is centered at approximately 0 V, eye A1 is centered at approximately 200 mV and eye A3 is centered at approximately +200 mV. As illustrated, the three distinct eyes, eye A1, A2, and A3 have tight transition groupings at their highest and lowest points, which is an indication that boost setting 129 results in minimum jitter and noise within the output signal produced by the equalizer 102. Moreover, the opening, the distance from the bottom of the eye to the top of the eye, of the eyes A1, A2, and A3 is greatest at the optimized boost setting 129, as shown.

FIG. 5B illustrates another example eye diagram 520 for a PAM4 signal for an equalizer setting of 128. In contrast to the eye diagram shown in FIG. 5A, the eye diagram 520 shown in FIG. 5B is not optimal. A non-optimal eye diagram, like the example shown in FIG. 5B, results in the three distinct eyes, eye B1, B2, and B3 have scattered transition groupings at their highest and lowest points, which is an indication that boost setting 128 results in jitter and noise within the output signal produced by the equalizer 102. Moreover, the opening of the eyes B1, B2, and B3 produced with a boost setting of 128 is much smaller than the openings of the eyes B1, B2, and B3 produced by the optimized boost setting 129, as shown.

Figure 6:
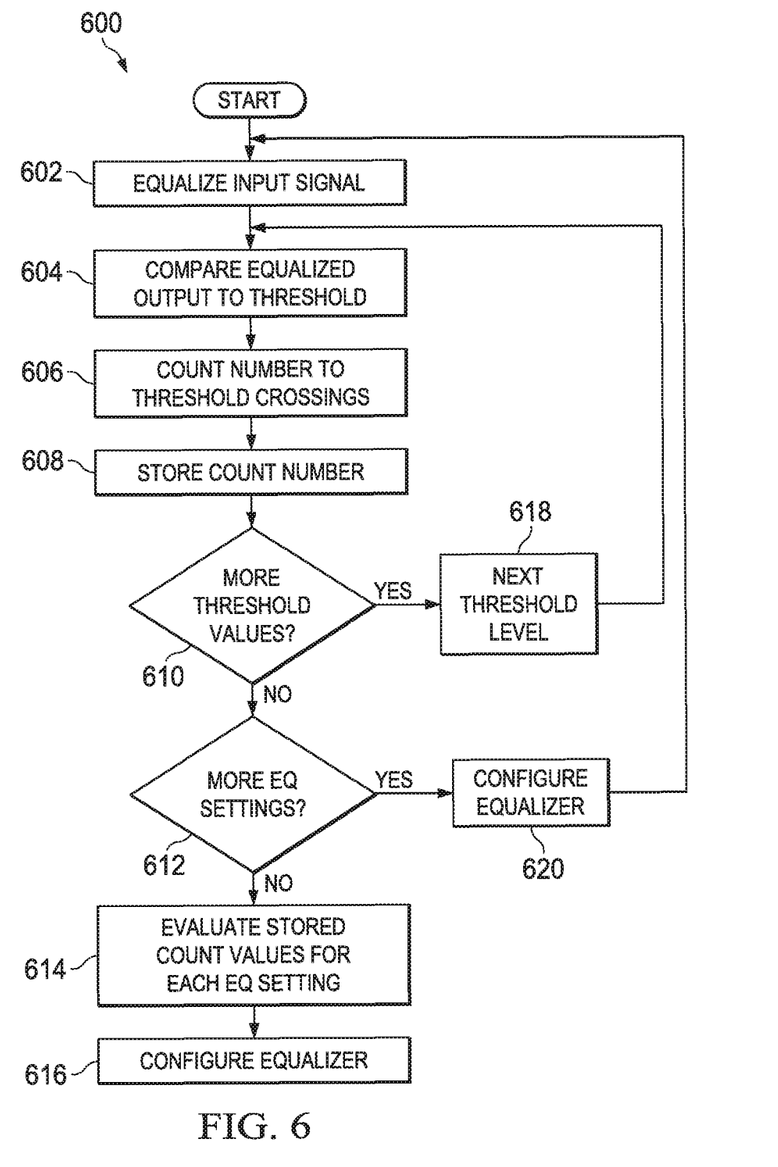
FIG. 6 illustrates an example method of configuring an equalizer setting.

In view of the foregoing structural and functional features described above, a method in accordance with various aspects of the present disclosure will be better appreciated with reference to FIG. 6. While, for purposes of simplicity of explanation, the method of FIG. 6 is shown and described as executing serially, it is to be understood and appreciated that the present disclosure is not limited by the illustrated order, as some aspects may, in accordance with the present disclosure, occur in different orders and/or concurrently with other aspects from that shown and described herein. Moreover, not all illustrated features may be required to implement a method in accordance with an aspect of the present disclosure.

FIG. 6 illustrates an example method 600 of configuring an equalizer setting. At 602, an incoming signal is equalized. The equalizer 102 accepts the digital input signal, RXIN and produces an equalized output signal. At 604, the equalized output signal is compared to a given threshold of a plurality of thresholds. The detector 104/comparator 202 compares the equalized output signal produced by the equalizer 102 to a threshold voltage. The threshold voltage may be set by the controller 108/208. In an example, the threshold voltage may be set by the controller 108/208 via the DAC 204.

At 606, a number of times is counted that the equalized output signal crosses the given threshold during a plurality of time intervals at a given equalizer setting. In an example, the counter 110 counts the number of times that the equalized output signal produced by the equalizer 102 crosses the given threshold during a plurality of time intervals at a given equalizer setting. At 608, such a count value is stored. In an example, the count value for each of the plurality of thresholds at the given equalizer setting based on the counting may be stored in memory 214 of the controller 208.

At 610, a determination is made whether there are more thresholds from the plurality of thresholds to evaluate. The controller 108/208 updates the threshold value until all thresholds are evaluated. The controller 108/208 determines if all of the thresholds have been evaluated. At 618, if there are additional thresholds to evaluate, the threshold is updated to a next threshold. The controller 108/208 may update the threshold to the next threshold. Once the threshold is updated, the comparing at 604, counting at 606, storing at 608, and determining at 610 are repeated for the next threshold.

At 612, if there are no additional thresholds to evaluate, a determination is made as whether there are additional equalizer settings to evaluate. The controller 108/208 determines if all the equalizer settings have been evaluated. At 620, the controller 108/208 may update the equalizer setting to a next equalizer setting if there are additional equalizer settings to evaluate. Once the equalizer setting is updated, the equalizing at 602, comparing at 604, counting at 606, storing at 608, and determining at 610 are repeated for a next equalizer setting.

At 614, if there are no additional equalizer settings to evaluate, the count values stored for each of the plurality of equalizer settings is evaluated to identify which of the plurality of equalizer settings resulted in a constant count value over the largest number of consecutive thresholds. The controller 108/208 may perform the evaluation. The controller 208 may retrieve the stored counted values from the memory 212. The controller 108/208 evaluates the count values stored for each of the plurality of equalizer settings to identify which of the plurality of equalizer settings resulted in a constant count value over the largest number of consecutive thresholds. At 616, the equalizer 102 is configured with the identified equalizer setting based on the evaluation. The controller 108/208 then sets the equalizer setting to that setting which resulted in a constant count value over the largest number of consecutive thresholds. Thus, the equalizer 102 may be optimally set to minimize jitter and noise within the output signal produced by the equalizer 102.

What have been described above are examples of the disclosure. It is, of course, not possible to describe every conceivable combination of components or method for purposes of describing the disclosure, but one of ordinary skill in the art will recognize that many further combinations and permutations of the disclosure are possible. Accordingly, the disclosure is intended to embrace all such alterations, modifications, and variations that fall within the scope of this application, including the appended claims.

What is claimed is:

1. A system, comprising:
    an equalizer to equalize an incoming signal and provide an equalized output signal over a plurality of time intervals according to a given equalizer setting thereof;
    a counter that provides a plurality of count values, each of the count values representing a number of times that the equalized output signal crosses each of a plurality of thresholds over plurality of the time intervals;
    a controller to evaluate the count value for each of the plurality of thresholds at each of a plurality of equalizer settings and to configure the equalizer setting based on the evaluation of the count values for each of the equalizer settings;
    a comparator to compare the equalized output signal to a direct current (DC) voltage threshold and to detect each occurrence that the equalized output signal crosses the DC voltage threshold over the plurality of time intervals; and
    a digital-to-analog converter that provides the DC voltage threshold in response to a digital input from the controller.

2. A system, comprising:
    an equalizer to equalize an incoming signal and provide an equalized output signal over a plurality of time intervals according to a given equalizer setting thereof;
    a counter that provides a plurality of count values, each of the count values representing a number of times that the equalized output signal crosses each of a plurality of thresholds over plurality of the time intervals; and
    a controller to evaluate the count value for each of the plurality of thresholds at each of a plurality of equalizer settings and to configure the equalizer setting based on the evaluation of the count values for each of the equalizer settings;
    wherein the controller estimates a cumulative distribution function (CDF) for each equalizer setting based on the count value for each of the plurality of threshold levels, each of the estimated CDF's being compared to determine which of the plurality of equalizer settings results in the count value being constant over the largest number of consecutive threshold levels.

3. A system, comprising:
    an equalizer to equalize an incoming signal and provide an equalized output signal over a plurality of time intervals according to a given equalizer setting thereof;
    a counter that provides a plurality of count values, each of the count values representing a number of times that the equalized output signal crosses each of a plurality of thresholds over plurality of the time intervals; and
    a controller to evaluate the count value for each of the plurality of thresholds at each of a plurality of equalizer settings and to configure the equalizer setting based on the evaluation of the count values for each of the equalizer settings;
    wherein the counter further comprises:
    a state machine to control the counter during the plurality of time intervals for a given threshold of the plurality of thresholds;
    a ripple counter to increment a ripple count value based on the number of times that the equalized output signal crosses the given threshold; and
    a synchronous counter to increment a synchronous count value in response to the ripple counter reaches a maximum count value, the ripple count value and the synchronous count value being aggregated over the plurality of time intervals to provide the count value for the given threshold.

4. The system according to claim 3, wherein the state machine further includes a programmable timer to control the plurality of time intervals during which the counter counts crossings for each of the plurality of thresholds.

5. The system according to claim 3, further comprising memory to store the count value based on the ripple count value and the synchronous count value being aggregated over the plurality of time intervals for each of the plurality of thresholds.

6. A method, comprising:
    equalizing an input signal to provide an equalized output signal;
    comparing the equalized output signal to a given threshold of a plurality of thresholds;
    counting a number of times that the equalized output signal crosses the given threshold during a plurality of time intervals at a given equalizer setting;
    storing a count value for each of the plurality of thresholds at the given equalizer setting based on the counting;
    repeating the counting and the storing for each other thresholds at each of a plurality of other equalizer settings;
    evaluating the plurality of count values stored for each of the plurality of equalizer settings to identify which of the plurality of equalizer settings resulted in a constant count value over the largest number of consecutive thresholds; and
    configuring the equalizer with the identified equalizer setting based on the evaluation.

7. The method according to claim 6, further comprising:
    comparing the equalized output signal to the threshold to provide a comparator output signal in response to detecting each occurrence that the output signal crosses the given threshold; and
    providing the count value based on the comparison during the plurality of time intervals for each of the plurality of thresholds.

8. The method according to claim 6, further comprising programmably setting the number of thresholds.

9. The method according to claim 6, further comprising estimating a cumulative distribution function (CDF) for each equalizer setting based on the count value for each of the plurality of threshold levels at each respective equalizer setting, each of the estimated CDF's being compared to determine which of the plurality of equalizer settings results in the count value being constant over a largest number of consecutive thresholds levels.

10. The method according to claim 6, further comprising:
controlling when to stop counting the number of times that the equalized output signal crosses the threshold;
ripple counting, with a ripple counter, the number of times that the equalized output signal crosses the threshold; and
triggering, with the ripple counter, an increment of a synchronous count value when the ripple counter reaches a maximum count value, the ripple count value and the synchronous count value being aggregated over the plurality of time intervals to provide the count value for each of the thresholds.

11. The method according to claim 6, further comprising controlling the plurality of time intervals during which the counter counts the number of times that the equalized output signal crosses the threshold.

12. The method according to claim 6, further comprising converting a digital threshold signal into the threshold.

13. A system, comprising:
an equalizer to equalize an input signal and provide an equalized output signal over a plurality of time intervals;
a comparator to compare the equalized output signal to a given threshold to detect each occurrence that the output signal crosses the threshold;
a counter to count a number of times that the equalized output signal crosses each of the plurality of thresholds for the given equalizer setting;
a controller to evaluate the number of times that the equalized output signal crosses each of the plurality of thresholds for each of a plurality of equalizer settings and to configure the equalizer setting based on the number of times that the equalized output signal crosses the plurality of thresholds for each of the equalizer settings; and
a digital-to-analog converter to set the threshold to one of the plurality of thresholds based on a threshold setting signal provided by the controller.

14. The system according to claim 13, wherein the counter further comprises:
a state machine to control the counter during the plurality of time intervals for a given threshold of the plurality of thresholds;
a ripple counter to increment a ripple count value based on the number of times that the equalized output signal crosses the given threshold; and
a synchronous counter to increment a synchronous count value in response to the ripple counter reaches a maximum count value, the ripple count value and the synchronous count value being aggregated over the plurality of time intervals to provide the count value for the given threshold.

15. The system according to claim 14, wherein the state machine further includes a programmable timer to control the plurality of time intervals during which the counter counts crossings for each of the plurality of thresholds.

16. The system according to claim 13, wherein the equalizer is one of a continuous time linear equalizer (CTLE), a decision feedback equalizer (DFE), and a feed-forward equalizer (FFE).

* * * * *